United States Patent [19]

Hashimoto

[11] Patent Number: 4,766,322
[45] Date of Patent: Aug. 23, 1988

[54] ROBOT HAND INCLUDING OPTICAL APPROACH SENSING APPARATUS

[75] Inventor: Hideaki Hashimoto, Kanagawa, Japan

[73] Assignee: Kabushiki Kaisha Toshiba, Kanagawa, Japan

[21] Appl. No.: 839,574

[22] Filed: Mar. 14, 1986

[51] Int. Cl.⁴ .............................................. B25G 13/08
[52] U.S. Cl. ......................................... 250/561; 901/9;
    901/35; 901/47; 364/513; 414/273; 414/730
[58] Field of Search ........................... 414/5, 730, 723;
    250/561; 901/9, 35, 47; 364/513

[56] References Cited

U.S. PATENT DOCUMENTS

| 3,952,880 | 4/1976 | Hill et al. ..................... 294/106 X |
| 4,309,618 | 1/1982 | Carter, Jr. et al. ................ 250/561 |
| 4,319,864 | 3/1982 | Kaufeldt ............................ 901/23 |
| 4,356,554 | 10/1982 | Susnjara et al. ................. 901/9 X |
| 4,423,998 | 1/1984 | Inaba et al. ..................... 414/730 |
| 4,541,771 | 9/1985 | Beni ............................. 901/35 X |

FOREIGN PATENT DOCUMENTS

WO84/04723  12/1984  PCT Int'l Appl. ................ 901/47

OTHER PUBLICATIONS

"Le Development de la Robotique", Georges Giralt, Tome 88, No. 5, May 1979, pp. 432–437.
Intelligent Machine Series, vol. I, "Microprocessor Based Robotics" by Mark J. Robillard, pp. 71–72.

Primary Examiner—Robert J. Spar
Assistant Examiner—Donald W. Underwood
Attorney, Agent, or Firm—Banner, Birch, McKie & Beckett

[57] ABSTRACT

A robot hand having six optical approach sensors each including a light emitting element and a light sensing element is disclosed. Each optical approach sensor is adapted to detect an object in the vicinity of the robot hand such that the object may be picked up or avoided. The sensor units are adapted to detect objects by reflecting light therefrom, receiving a portion of the reflected light and providing an output signal, the magnitude of which is proportional to the intensity of received light. An output circuit is responsive to the sensor output for determining the magnitude of the sensor output signal, and hence the distance which separates the approach sensing unit and the object. The output circuit thus provides a plurality of control signals which are used by a motion control processor to control the speed at which the robot moves.

3 Claims, 9 Drawing Sheets

TABLE 1

| | | SELECTIVE COMMAND SIGNAL MODE | | | | | | | |
|---|---|---|---|---|---|---|---|---|---|
| | | 1 | 2 | 3 | 4 | 5 | 6 | 7 | 8 |
| SENSOR 22 | LED 132 | 0 | 0 | X | X | X | X | X | X |
| | P-Tr 142 | X | 0 | 0 | X | X | X | X | X |
| SENSOR 23 | LED 133 | X | X | 0 | 0 | X | X | X | X |
| | P-Tr 143 | 0 | X | X | 0 | X | X | X | X |
| SENSOR 24 | LED 134 | X | X | X | X | 0 | X | X | X |
| | P-Tr 144 | X | X | X | X | 0 | X | X | X |
| SENSOR 25 | LED 135 | X | X | X | X | X | 0 | X | X |
| | P-Tr 145 | X | X | X | X | X | 0 | X | X |
| SENSOR 26 | LED 136 | X | X | X | X | X | X | 0 | X |
| | P-Tr 146 | X | X | X | X | X | X | 0 | X |
| SENSOR 27 | LED 137 | X | X | X | X | X | X | X | 0 |
| | P-Tr 147 | X | X | X | X | X | X | X | 0 |

FIG.12.

ROBOT HAND INCLUDING OPTICAL APPROACH SENSING APPARATUS

BACKGROUND OF THE INVENTION

The present invention relates to a robot hand for grasping objects and, more particularly, to a robot hand including optical approach sensing elements for detecting the distance between the robot hand and the object to be picked up.

Industrial robot hands or manipulators are currently being introduced into various industrial fields. These robot hands result in production efficiencies as well as significant cost savings. In such industrial applications, robot hands which can pick up objects and transfer them to a predetermined position are essential.

However, presently available robot hands which have been adapted for picking up objects have proven inadequate for most industrial applications. As an example, many presently available robot hands are adapted for picking up objects which are arranged in a predetermined position, e.g., occur at regular intervals along a conveyor which moves at a constant speed. Such devices incur difficulties maintaining synchronism with the series of objects. Further, difficulties are encountered when one or several objects have been misplaced.

Other presently available robotic hands employ complicated visual recognition systems for determining the position of objects to be picked up. These systems generally include sophisticated information processing circuitry for processing the massive amount of data necessary for visual recognition. These systems are typically very high in cost, and, therefore, impractical for most industrial applications.

Still other robot hands have been provided with a plurality of light emitting devices for generating a plurality of light beams such that the hand is capable of picking up an object when the center of the object is not located preciselsy at the prescribed position. Such a robot hand has been disclosed in U.S. Pat. No. 4,423,998, issued Jan. 3, 1984, to Hajimu Inaba et al. This system, however, is not capable of detecting the distance between the robot hand and the object to be picked up. Also, this system is unable to detect objects which may provide an obstacle to movement of the robot hand.

It is, therefore, desirable to provide a robot hand which is capable of picking up objects. It is further desirable to provide a robot hand which is capable of picking up objects whether or not the object is located at a predetermined position. Similarly, it is desirable to provide a robot hand which is capable of determining the distance between the robot hand and an object which is to be picked up. It is also desirable to provide a robot hand which is capable of determining the distance between the robot hand and other objects within the immediate vicinity of the robot hand. As always, it is desirable to provide such a robot hand without employing expensive electronic circuitry.

SUMMARY OF THE INVENTION

It is, therefore, a primary object of the present invention to provide a robot hand which is capable of picking up objects.

It is another object of the present objection to provide a robot hand which is capable of determining the distance between the robot hand and other objects in the vicinity of the hand.

It is a further object of the present invention to provide a robot hand which is capable of determining the distance between the robot hand and the objects which surround it and, therefore, is capable of picking up objects whether or not the object is located in a predetermined position.

It is a still further object of the present invention to provide a robot hand including apparatus for determining the distance between the robot hand, and objects in the immediate vicinity of the robot hand which apparatus can be provided without employing expensive electronic circuitry.

The foregoing objects of the invention are met by providing inexpensive apparatus for determining the distance between a robot hand and an object in the vicinity thereof. In accordance with the apparatus and method of the present invention, a distance sensing device is provided for reflecting light from an object and receiving a portion of the reflected light such that the intensity of light received is indicative of the distance between the robot hand and the object. The distance sensing device is also adapted to provide a sensor signal output, the magnitude of which is indicative of the intensity of received light. A robot driving controller is provided and is responsive to the sensor signal for varying the speed at which the robot hand moves.

BRIEF DESCRIPTION OF THE DRAWINGS

Further objects, features and advantages of the invention will become apparent from a reading of the following detailed description taken in conjunction with the drawings in which:

FIG. 12 is a chart illustrating the operation of the sensor circuit of FIG. 8 to activate several of a plurality of approach sensors in response to command signals received from a robot controller.

DETAILED DESCRIPTION OF THE DRAWINGS

Figure 1:
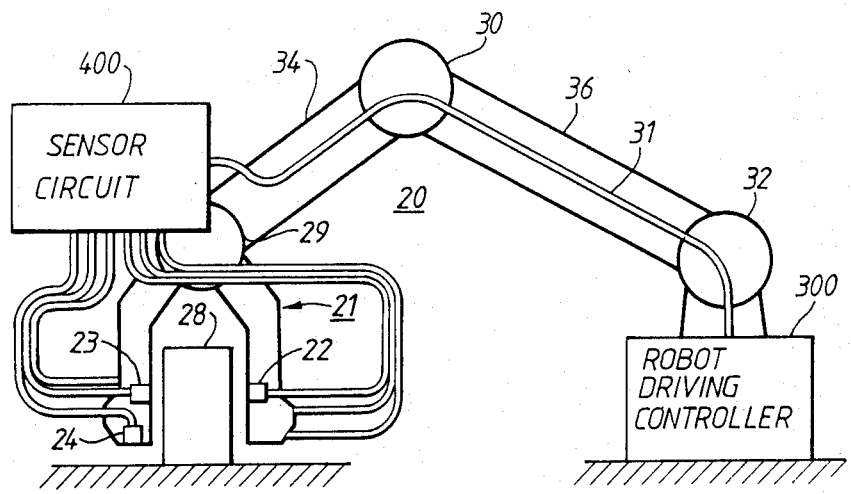
FIG. 1 is a schematic illustration of a multi-joint type robot system according to the present invention.

With reference to FIG. 1, there is shown a schematic illustration of an industrial multi-joint type robot 20 including approach sensing apparatus in accordance with the present invention. A robot 20 comprises movable joints 30 and 32 each including arm-driving mechanisms for moving the arms 34 and 36 of robot 20. A robot hand 21 is coupled to arm 34 via finger driving mechanism 29. Driving mechanism 29 is provided for moving the robot fingers of robot hand 21 as will be described more fully herein below.

Figure 4:
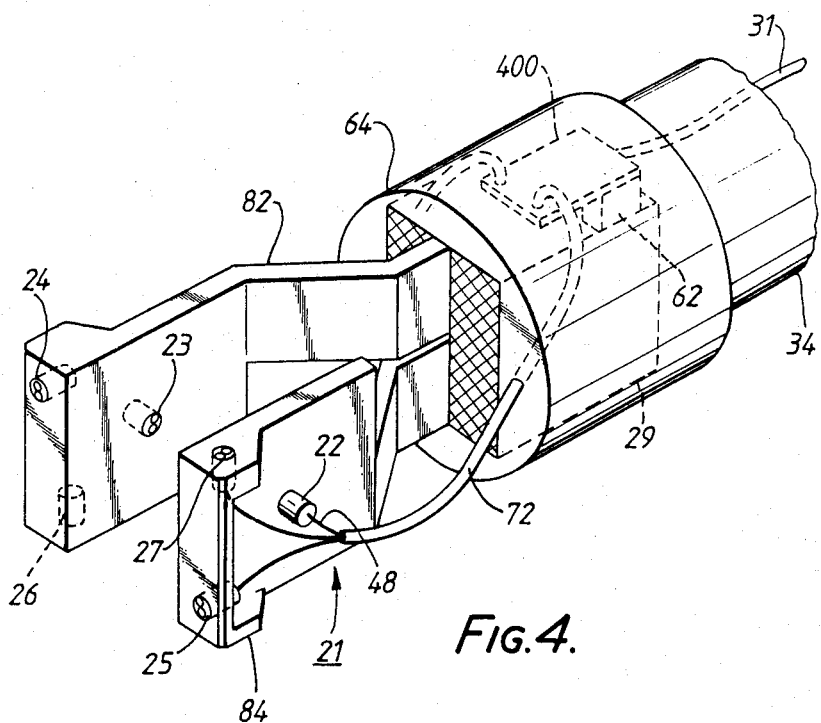
FIG. 4 is a more detailed illustrative schematic diagram of a robot hand in accordance with the present invention.

A plurality of approach sensors 22 through 27 (the positioning of all approach sensors 22-27 is shown more clearly in FIG. 4) are provided for sensing the distance between robot hand 21 and objects in the immediate vicinity thereof. Each approach sensor 22 through 27 is coupled to a sensor circuit 400 (FIG. 1) which communicates with robot driving controller 300 via lead cable 31. Lead cable 31 is disposed intermediate arms 34 and 36 in such a manner so as to remain parallel thereto such that the lead cable does not interfere with the motion of robot 20. Robot driving controller 300 is provided for initiating and terminating the motion of the robot as well as for storing position and sequence data for operations which are to be performed. Driving controller 300 may comprise any apparatus constructed from data processing devices as is well known in the art. Similarly, driving mechanisms 29, 30 and 32 as well as arms 34 and 36 and lead cable 31 may all be constructed of conventional components as is known in the robotics art.

Each approach sensor 22-27 is adapted to provide an output signal, the magnitude of which is indicative of the distance between the sensor and an object in the vicinity thereof. To this end, each approach sensor is adapted to reflect light from an object and to receive a portion of the reflected light such that the intensity of light received is indicative of the distance between the sensor and the object from which light was reflected.

Figure 2:
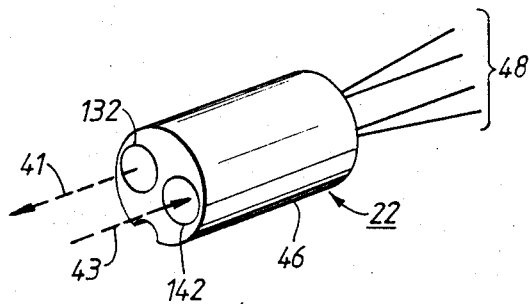
FIG. 2 is an enlarged schematic illustration of an approach sensor according to the present invention.

With reference to FIG. 2, a more detailed schematic of approach sensor 22 is provided. As shown therein, approach sensor 22 comprises light emitting element 132 and light sensing element 142 both disposed within shelf 46. Light emitting element 132 is provided for transmitting optical energy in a first direction 41 to be reflected from an object. Light sensing element 142 is provided for sensing at least a portion 43 of the transmitted optical energy which is reflected back toward the light emitting element. Light emitting element 132 and light sensing element 142 are disposed on a common face of approach sensor 22 facing in generally the same direction such that the intensity of light received is indicative of the distance between the approach sensor and the object from which light was reflected.

A plurality of lead wires 48 are disposed on an opposite face of approach sensor 22, of which two lead wires are provided for supplying electrical energy to and from light emitting element 132 and comprise the input voltage to the approach sensor. The two remaining lead wires are provided for supplying electrical energy to and from light sensing element 142 and comprise the output voltage from the approach sensor.

Light emitting element 132 may comprise any apparatus adapted for emitting light in response to electrical energy. Light sensing element 142 may comprise any device for providing voltage output and modulating the magnitude of voltage output in response to the intensity of light received. In the preferred embodiment, light emitting element 132 comprises a light emitting diode (LED) as is known in the art. Similarly, in accordance with the preferred embodiment, light sensing element 142 comprises a phototransistor as is also known in the art.

As shown in FIG. 2, light emitting element 132 and light receiving approach 142 are disposed on a common plane of optical approach sensor 22 in close proximity to one another. When light emitting element 132 is energized via lead wires 48, optical energy is transmitted in the general direction as illustrated by reference numeral 41. If an object is in the vicinity of approach sensor 22, in the direction as illustrated by reference number 41 with respect to the approach sensor, then a portion of the optical energy transmitted by light emitting element 132 will be reflected back toward the light emitting element in the general direction as illustrated by reference numeral 43. At least a portion of this energy will be received by light sensing element 142.

As mentioned above, light sensing element 142 is adapted to modulate the magnitude of voltage output in response to the intensity of light received. Because the portion of optical energy which is received by light sensing element 142 is dependent in part on the distance between the approach sensor and the object in the vicinity thereof, and further because distance is the only dynamic variable of the system which substantially affects the intensity of light received by light sensing element 142, then the magnitude of voltage supplied by light sensing element 142 is indicative of the distance between the reflective object and approach sensor 22.

Figure 3A:
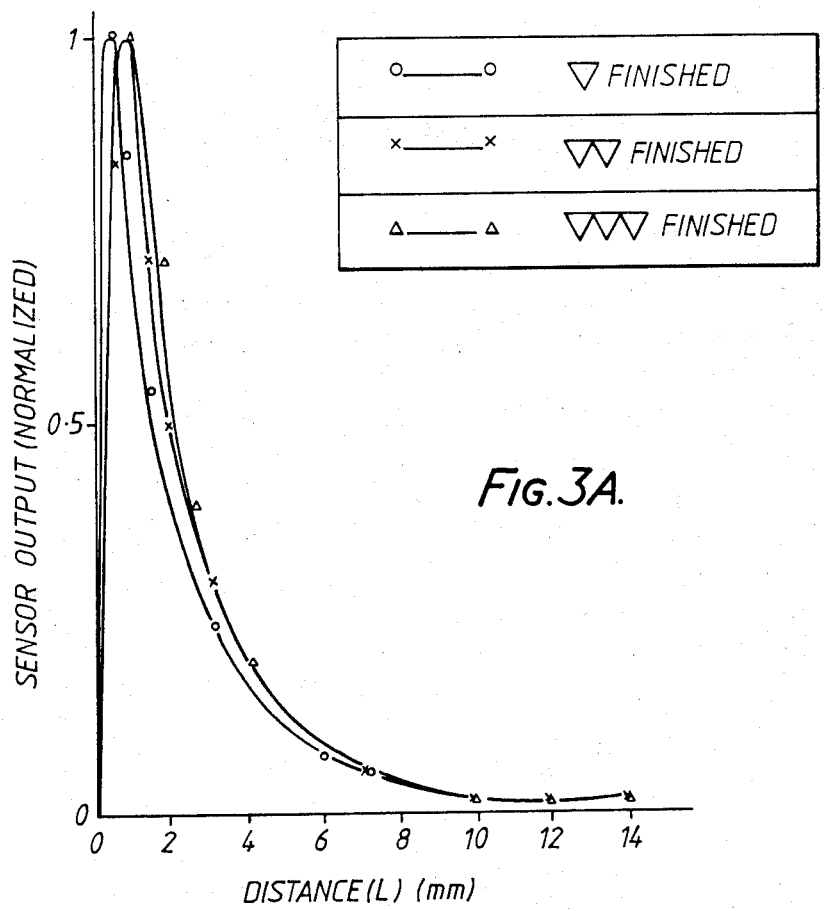
FIG. 3A is a graph of normalized sensor output versus distance (L) for the approach sensor illustrated in FIG. 2.
Figure 3B:
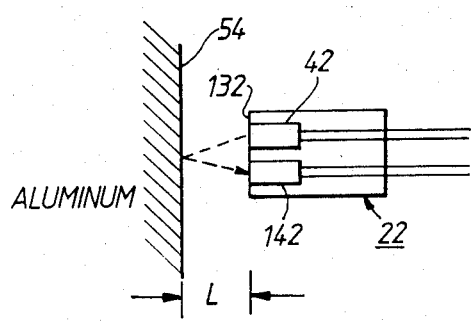
FIG. 3B is an illustration defining the distance (L), the abscissa of the graph of FIG. 3A.

A characteristic curve illustrating the sensor output (i.e., the modulated voltage from light sensing element 142) versus the distance between the sensor 22 and an aluminum object 54 is provided in FIG. 3A. Therein, optical approach sensor 22 is energized such that the distance L, defined as shown in FIG. 3B, between the sensing plane 52 and the surface of an aluminum object 54 can be determined. The curves provided therein are curves of the normalized optical light sensor output versus the distance L between the sensing plane and the surface of aluminum object 54. Several graphs are provided each representing the response of optical approach sensor 22 as it encounters aluminum surface 54 having a particular finish. As identified in FIG. 3A, the graphs correspond to surfaces with: rough finishes (∇), intermediate finishes (∇∇), and precision finished surfaces (∇∇∇).

It is noted that the magnitude of the sensor output reaches a peak level as the distance L varies from about 0.5 to about 1 millimeter from the reflecting object. As the distance increases beyond 1 millimeter, the magnitude of the sensor output decreases exponentially. Hence, the value of distance L can be detected by monitoring the magnitude of the sensor signal output and comparing this magnitude to a predetermined reference such as the chart of FIG. 3A.

With reference to FIG. 4, a more detailed schematic diagram of robot hand 21 of FIG. 1 is provided. Therein, robot hand 21 is shown to include two fingers 82 and 84. Fingers 82 and 84 are actuated by driving mechanism 29 so as to approach or separate from each other to permit a work piece to be gripped or released. Three optical approach sensors 23, 24, and 26 are disposed on finger 82 and three optical approach sensors 22, 25 and 27 are disposed on finger 84. Optical approach sensors 24 and 25 are disposed on the end portions of fingers 82 and 84, respectively, facing in a direction generally outwardly along the main axis of robot hand 21. Optical approach sensors 26 and 27 are disposed on the side surface portions of fingers 82 and 84, respectively, and are disposed on opposite sides of robot hand 21. Approach sensors 23 and 22 are disposed on fingers 82 and 84, respectively, in optically aligned facing relationship, as will be described more fully hereinbelow.

The spacing and positioning of approach sensors 22–27 as shown in FIG. 4 maximizes the optical sensing ability of the robot using a minimum of approach sensing devices. It will be apparent to those skilled in the art that the position of approach sensors 22–27 may be varied without departing from the true scope and spirit of the invention. Particularly, the positioning of the approach sensors may be varied as the application of the robot varies. As an example, if the robot is adapted to move in only two directions, then only two approach sensors may be desired, plus the two gripping sensors 22 and 23.

Returning to FIG. 4, sensor circuit 400 and battery 62, for energizing the sensor circuit, are both disposed within a housing 64 together with driving mechanism 29. Two distribution cables 72 are provided, (only one is shown in FIG. 4) each associated with a finger of robot hand 21 for uniting the lead wires from the three approach sensors disposed within that finger. The use of distribution cables 72 adds stability to the lead wires thus preventing severance thereof.

Figure 5:
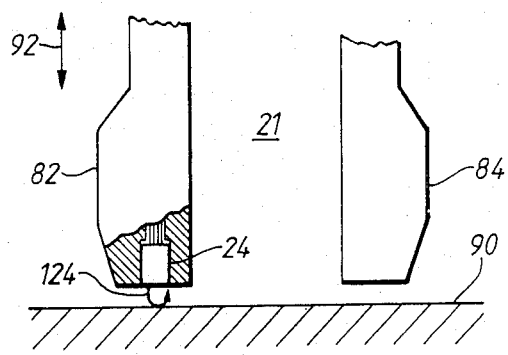
FIGS. 5, 6 and 7 are schematic diagrams illustrating the operation of the robot hand built in accordance with the present invention.
Figure 6:
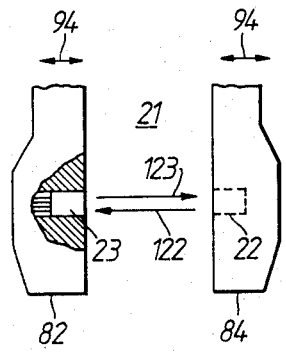
Figure 7:
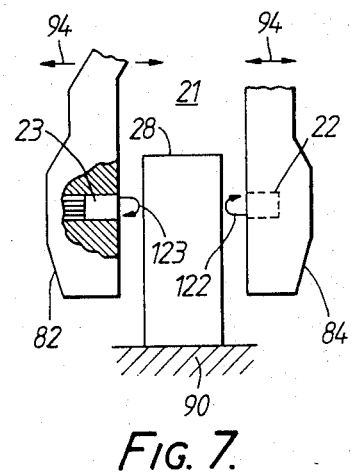

With reference to FIGS. 5–7, a brief description of the operation of the approach sensors of the present invention will be provided. FIG. 5 shows the operation of sensor 24 as robot hand 21 is moved toward base 90. Sensor 24 is energized and, therefore, optical energy in the form of light beam 124 is emitted toward base 90, a portion of which is reflected back toward sensor 24. Sensor 24 receives a portion of the reflected light beam 124 and provides an output signal indicative thereof, as described hereinabove. As robot hand 21 moves closer to base 90, the intensity of light received by sensor 24 increases. Accordingly, the sensor output signal, which is provided to robot driving controller 300 (FIG. 1), also increases (see FIG. 3A). Driving controller 300 responds to the sensor output signal to control the speed at which the robot moves. Hence, as the robot approaches base 90, driving controller 300 responds to the sensor output signal to retard the motion of the robot such that the robot approaches base 90 at a decreased speed. As the robot continues to approach base 90, driving controller 30 provides another control signal to completely stop the robot movement. In this manner, undesired contact with base 90 is avoided. Alternatively, if contact with base 90 is desired, then the robot would be controlled to move at its slowest speed until contact is made.

With reference to FIGS. 6 and 7, the grasping action of robot hand 21 will be explained. Sensors 22 and 23 are disposed in optical alignment in opposite fingers of robot hand 21. As used herein, optical alignment refers to that disposition of approach sensors 22 and 23 wherein the light emitting element of approach sensor 23 is optically aligned with the light sensing element of approach sensor 22 and, further, wherein the light emitting element of approach sensor 22 is optically aligned with the light sensing element of optical approach sensor 23. Hence, optical approach sensors 22 and 23 can be advantageously used to detect the condition where no object is located intermediate of fingers 82 and 84, FIG. 6. Also, optical approach sensors 22 and 23 can be used to detect the individual distance between fingers 84 and 82, respectively, and an object 28 disposed therebetween. In this regard, the operation of sensors 22 and 23 to determine one of the above noted conditions, is controlled by sensor circuit 400 which is provided to energize and enable select combinations of light emitting elements and light sensing elements.

Figure 8:
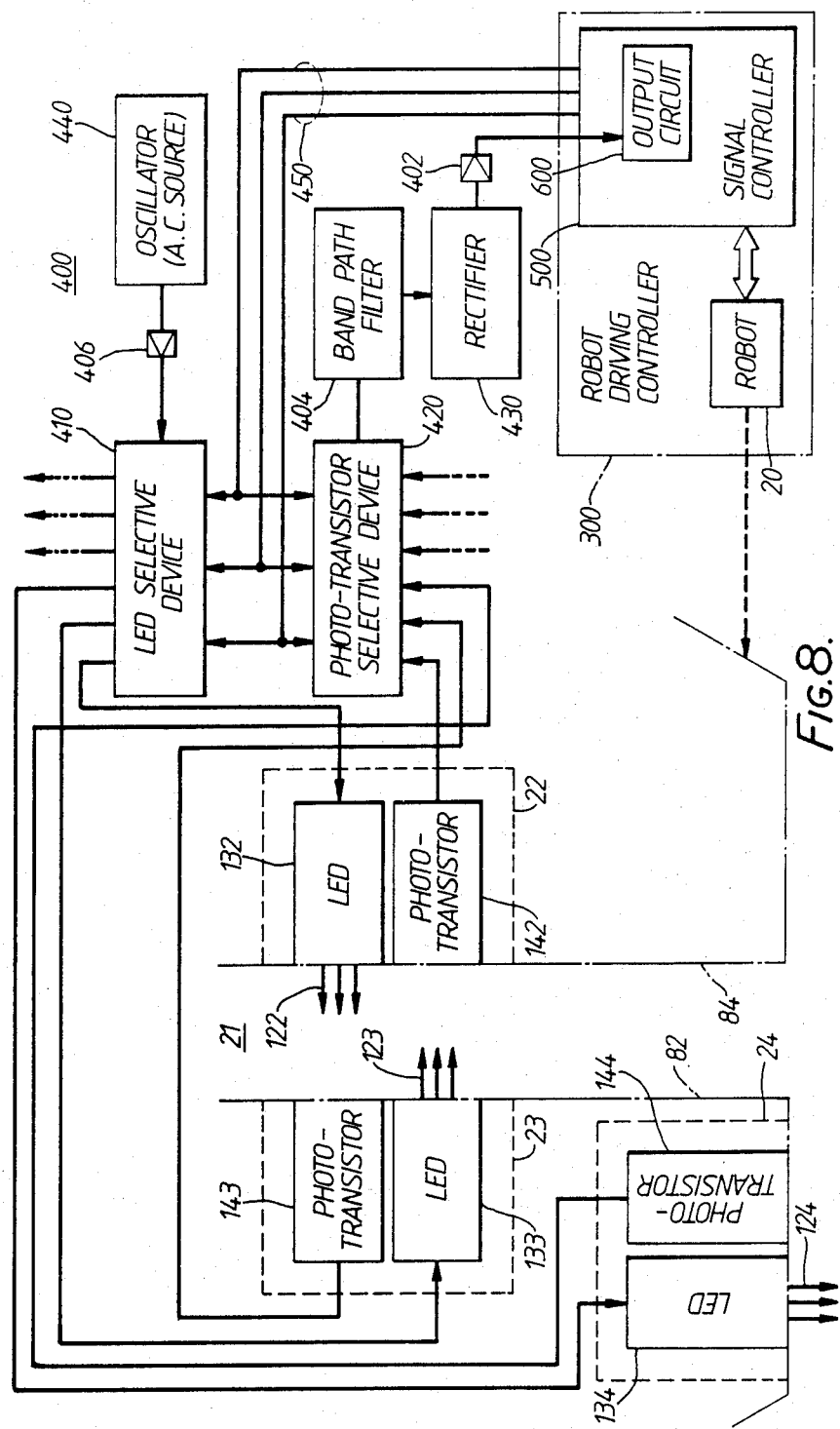
FIG. 8 is a more detailed illustrative block diagram of the sensor circuit which is a component part of the approach sensor of the present invention.

With reference to FIG. 8, sensor circuit 400 is shown to include oscillator 440 adapted to provide an alternating current source to the light emitting elements of the optical approach sensors via LED selective device 410 and amplifier 406. A phototransistor selective device 420 is also provided and is coupled to each light sensing element of the optical approach sensors for selectively providing the output thereof to bandpass filter 404. Both LED selective device 410 and phototransistor selective device 420 are responsive to a three digit binary coded decimal select command signal received from robot driving controller 300 to respectively couple oscillator 440 to one of a plurality of light emitting elements and to couple one of a plurality of light sensing elements to bandpass filter 404.

LED selective device 410 and phototransistor selective device 420 may comprise conventional de-multiplexing and multiplexing devices, respectively, for performing the functions as described herein. Oscillator 440 is preferably adapted to provide an alternating current voltage signal having a frequency of approximately 4.8 KHz. Both oscillator 440 and amplifier 406 may each comprise conventional devices as is known in the art.

LED selective device 410 and phototransistor selective device 420 are adapted to select predetermined pairs of light emitting elements and light sensing elements such that the appropriate distance detection function can be performed and further such that gripping sensors 22 and 23 can determine the presence (or absence) of an object between the fingers of the robot hand. With reference to the table of FIG. 12, there is shown the combination of light emitting elements and light sensing elements which are selected for each of the eight select command signals 450. As shown therein a 0 represents a selected device and a X represents a nonselected device. It is noted that select command signal 1 (i.e., BCD 001) results in the selection of the light emitting element of sensor 22 and the light sensing element of sensor 23. Similarly, select command signal 3 (i.e., BCD 011) results in the selecting of the light sensing element of sensor 22 and the light emitting element of sensor 23. These command signals are provided for determining whether an object is disposed intermediate of fingers 82 and 84 (FIG. 6) as discussed above.

It will be apparent to those skilled in the art that while the optical approach sensors of FIG. 6 were described as being in complete optical alignment, it is only necessary that the light emitting element of sensor 22 be optically aligned with the light sensing element of sensor 23 such that meaningful data will be provided in response to select command signal mode 1 as shown in table 1 of FIG. 12. In such an embodiment, command signal mode 3 will not provide meaningful data and, therefore, should not be supplied to LED selective device 410 or phototransistor selective device 420.

It will be further obvious to those skilled in the art that in accordance with the table of FIG. 12, only one light emitting element is energized at any particularly point in time. Likewise, only one light sensing element is selected at any point in time. Such a selection scheme is intended to eliminate interference between the approach sensors and, therefore, result in more reliable measurements. It is apparent, however, that several approach elements may be energized simultaneously.

As an example, approach sensors 26 and 27 (FIG. 4) may be energized simultaneously with minimal adverse consequences. Similarly, after an approach has been detected intermediate fingers 82 and 84, approach sensors 22 and 23 may be energized simultaneously without significant optical interference therebetween.

Returning to FIG. 8, phototransistor selective device 420 is coupled to robot driving controller 300 via bandpass filter 404, rectifier 430 and amplifier 402. Bandpass filter 404 is preferably chosen to pass signals within a frequency range centered about 4.8KHz. Bandpass filter 404, rectifier 430 and amplifier 402 may each comprise conventional elements as it known in the art.

Figure 9:
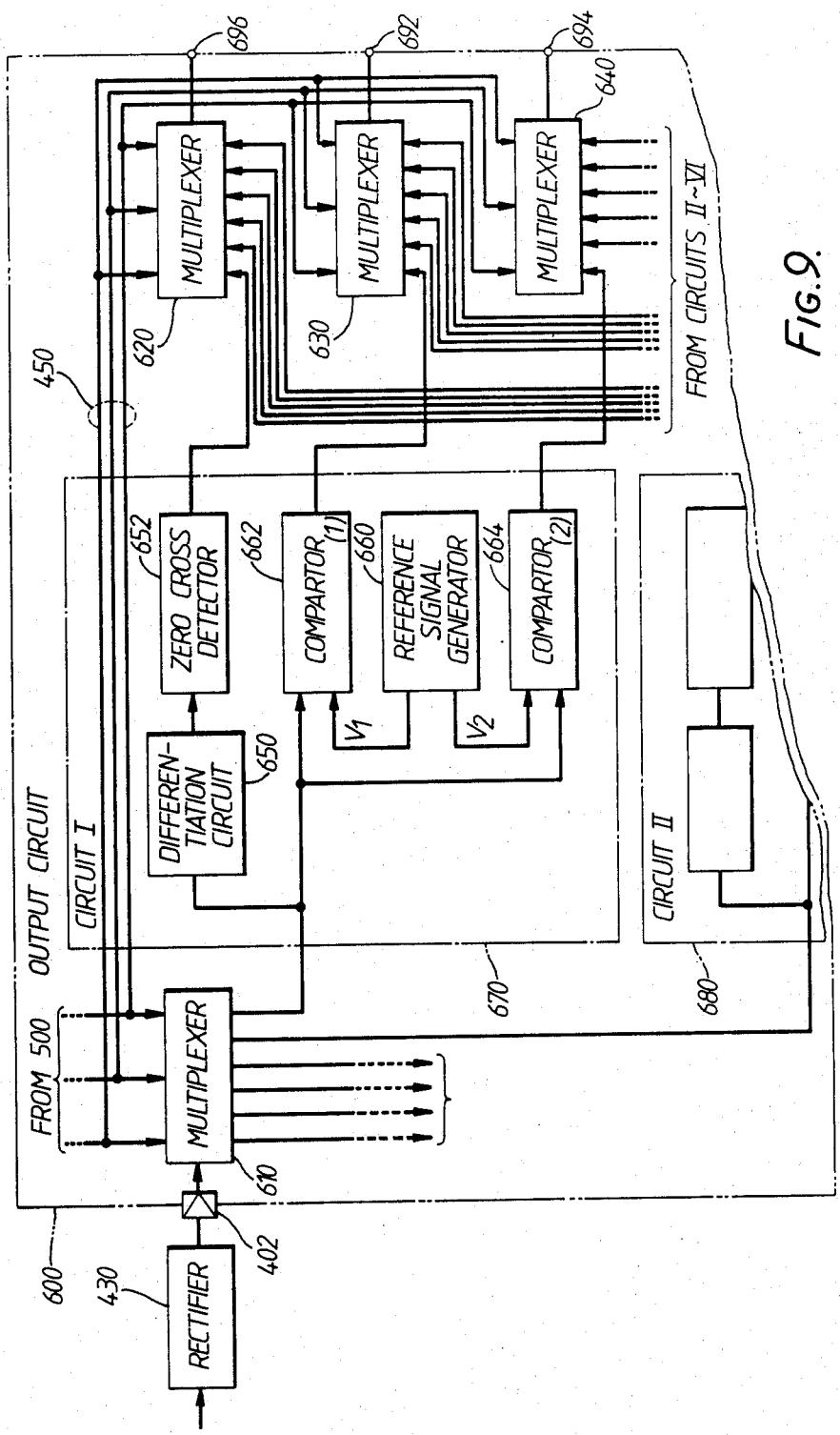
FIG. 9 is a more detailed illustrative block diagram of output circuit 600 shown in FIG. 8.

With reference to FIG. 9, there is provided a more detailed illustrative block diagram of output circuit 600. Output circuit 600 comprises four multiplexers 610, 620, 630 and 640, each adapted to receive the select command control signal 450. Multiplexer 610 is adapted for receiving the approach sensor output via amplifier 402 of sensor circuit 400. Multiplexer 610 is also coupled to a plurality of control signal generator circuits 670, 680, etc., each being associated with a particular approach sensor for generating the appropriate robot control signals from the output of its associated approach sensor. Hence, multiplexer 610 is responsive to the select command control signal for coupling the output from a particular optical approach sensor, as received from sensor circuit 400 to its associated control signal generation circuit.

Each control signal generation circuit includes a reference signal generator 660 which is adapted to generate two distinct reference voltages $V_1$ and $V_2$. The voltages $V_1$ and $V_2$ are coupled to two comparators 662 and 664, respectively, which comparators are adapted to compare the magnitude of the reference voltage supplied by reference signal generator 660 to the magnitude of the output voltage of its associated approach sensor. Each comparator 662 and 664 of each control signal general circuit is coupled to multiplexers 630 and 640. As mentioned above, multiplexers 630 and 640 are responsive to the select command control signal for coupling one of the control generation circuit outputs to output terminals 692 and 694. The output from output circuit 600, provided at terminals 692, 694 and 696, is supplied to driving controller 300 for controlling the motion of the robot.

Each control signal generation circuit is adapted for comparing the output from its associated approach sensor to the reference voltage levels $V_1$ and $V_2$. The desired magnitude of voltages $V_1$ and $V_2$ is selected by referring to the graph of FIG. 3, such that comparison with the output voltage of an approach sensor will indicate that the approach sensor is a predetermined distance from an object. By selecting $V_1$ to be less than $V_2$, the output from comparator 662, and hence the output from multiplexer 630, provides an indication that an object is in the vicinity of the approach sensor which has been selected. If, thereafter, the output from comparator 664 is activated, then the selected approach sensor is supplying a greater output voltage indicating that it is moving even closer to the object in its vicinity. Driving controller 300 uses the output from the output circuit to control the motion of the robot as discussed above.

In addition to the signals provided by comparators 662 and 664, a third signal can be provided which indicates that the output of the approach sensor has reached it maximum magnitude. This signal is provided by differentiation circuit 650 and zero cross detector 652. Differentiation circuit 650 is adapted to differentiate the input to the control signal generator circuit to provide an output signal indicative of the time rate of change of its associated approach sensor output, as is known in the art. Such differentiation is provided to identify the peak output of the optical approach sensor (FIG. 3). The output from differentiation circuit 650 is coupled to zero cross detector 652. Hence, as the optical approach sensor approaches an object, differentiation circuit 650 will essentially provide an output voltage signal corresponding to the derivative of the curve shown in FIG. 3. As the output of the optical approach sensor reaches its maximum, the output from differentiation circuit 650 will approach zero and zero cross detector 652, will provide an output indicative of the zero crossing. This output is multiplexed to output terminal 696 of multiplexer 620 to provide an immediate stop signal to robot 20.

It will be appreciated by those skilled in the art that since a plurality of control signal generator circuits are provided, one for each optical approach sensor, then each reference signal generator 660 of each control signal generator can be adapted to provide different reference voltages $V_1$ and $V_2$ and hence will provide varying sensitivities for each optical approach sensor.

It will be also apparent to those skilled in the art that driving controller 300 supplies the select command signals which controls the operation of LED selective device 410, phototransistor selective device 420, and multiplexers 610–640. In operation, driving controller 300 will select a particular approach sensor to be activated and will receive from output circuit 600 the control signals generated from that particular approach sensor's output. While the driving controller of the present invention selects sensors sequentially, this manner of selecting approach sensors is not necessary for proper operation of the invention. Hence, any criterion or scheme can be developed for selecting approach sensors.

Figure 10:
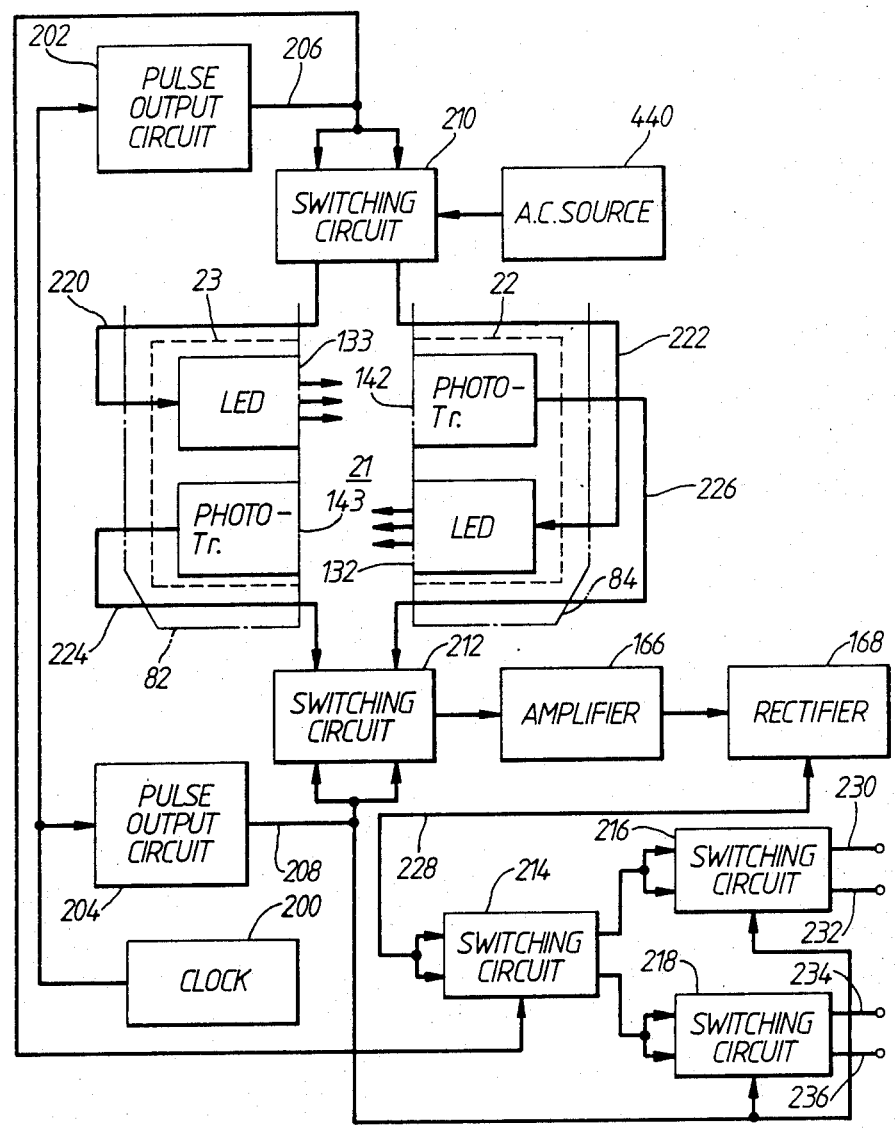
FIG. 10 is an illustrative block diagram of an alternative embodiment of sensor circuit 400 shown in FIG. 8.

A still further embodiment of the present invention is illustrated in FIG. 10. Therein, only sensors 22 and 23 are shown for convenience. The circuit of FIG. 10 is constructed with a clock 200 adapted for providing clock pulses to two output pulse circuits 202 and 204. Each output pulse circuit 202 and 204 is adapted for obtaining a desirable pulse output 206 and 208 as shown in FIG. 11. Two switch circuits 210 and 212 for switching sensors 22 and 23 are coupled to pulse output circuits 202 and 204, respectively. Amplifier 166 and rectifier 168 are coupled to output terminals 230, 232, 234 and 236 via switching circuits 214, 216 and 218.

Figure 11A:
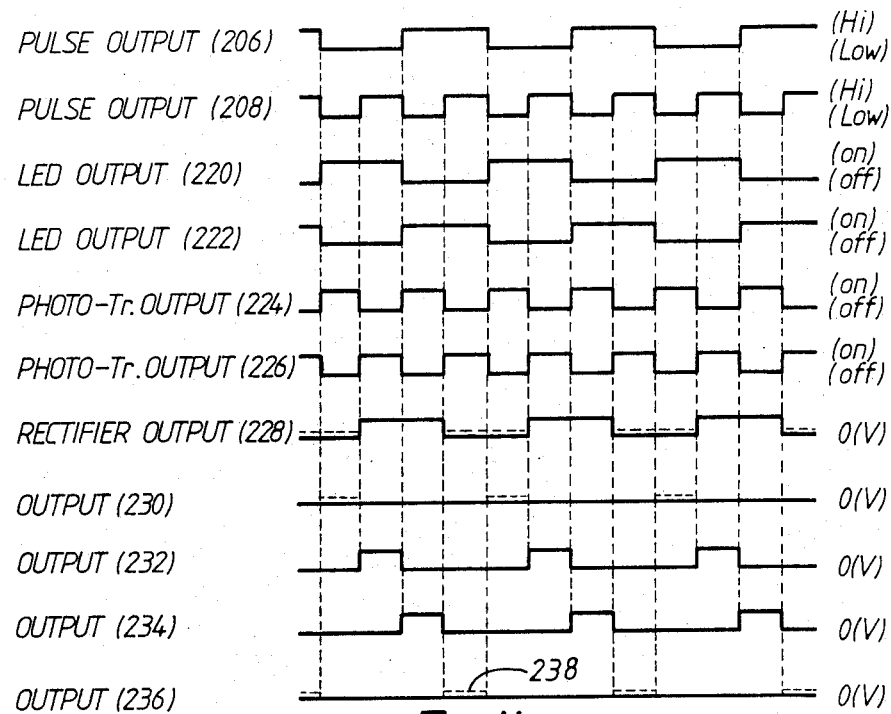
FIGS. 11(a) and 11(b) are timing charts of the circuit shown in FIG. 10.
Figure 11B:
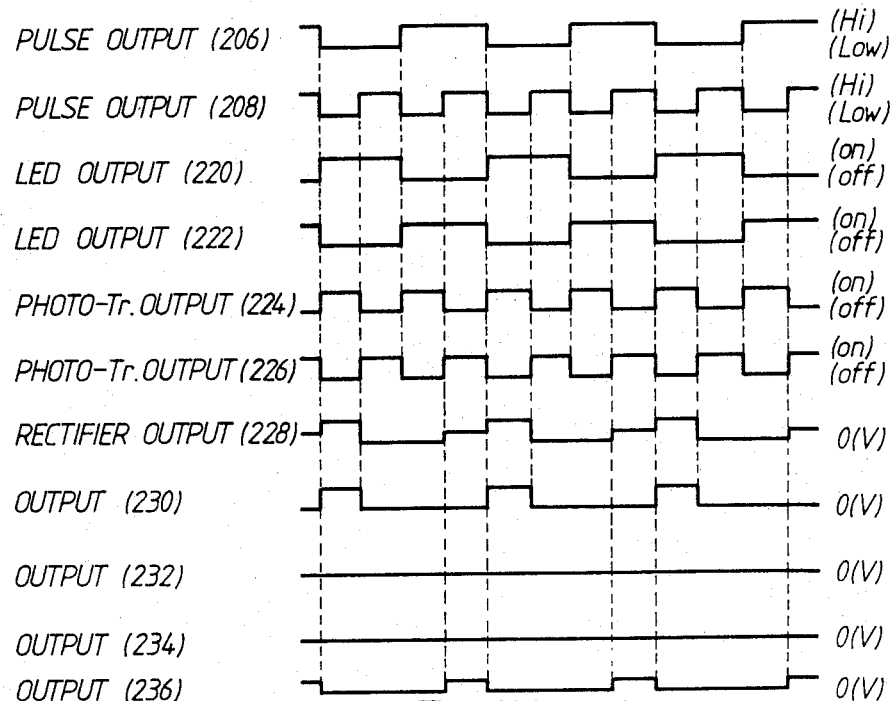

A timing chart which refers to each signal of the circuit of FIG. 10 is shown in FIGS. 11(a) and (b). It will be noted by reference to FIG. 11 that the period of the pulse output signal 206 obtained from the pulse output circuit 202 is twice the period of output signal 208 obtained from pulse output circuit 204. Signals 220 and 222 represents the output from LEDs 132 and 133, respectively. The output from one phototransistor 142 and 142 is provided to rectifier 168 via amplifier 166 and switching circuit as determined by the state of pulse output 208. Rectifier 168 provides output signal 228. The output from rectifier 168 is coupled to switch circuit 214 and the output from switch circuit 214 is coupled selectively to switch circuit 216 or switch circuit 218 in response to pulse output 206.

Obviously, many modifications and variations of the above described preferred embodiments will become apparent to those skilled in the art from a reading of this disclosure. It should be realized that the invention is not limited to the particular apparatus disclosed, but its scope is intended to be governed only by the scope of the appended claims.

I claim:

1. Apparatus for controlling the movement of a robot hand in response to the distance between the robot hand and objects in the vicinity thereof, said apparatus comprising:

distance sensing means for reflecting light from an object and receiving at least a portion of the reflected light such that the intensity of light received is indicative of the distance between the robot hand and the object, said distance sensing means being further adapted to provide a sensor signal output the magnitude of which is indicative of the intensity of received light; and control means for controlling the movement of the robot hand, said control means being responsive to said sensor signal for determining the distance between the robot hand and the object, said control means being further responsive to the determined distance for varying the speed at which the robot hand moves, said control means comprising output circuit means coupled to receive the output from said distance sensing means for determining when the robot hand is a predetermined distance from the object, said output circuit means being responsive to the sensor signal from said distance sensing means for providing first and second output signals, the first output signal indicating that the robot hand is a first predetermined distance from the object and the second output signal indicating that the robot hand is a second predetermined distance from the object, said output circuit means comprising a reference signal generator for generating first and second voltage signals each of a predetermined magnitude; and first and second voltage comparator means adapted to receive the first and second voltage signals, respectively, said first comparator means for providing the first output signal when the magnitude of the sensor signal exceeds the predetermined magnitude of the first voltage signal and said second comparator means for providing the second output signal when the magnitude of the sensor signal exceeds the predetermined magnitude of the second voltage signal.

2. Apparatus as recited in claim 1 wherein said output circuit means is responsive to the sensor signal for providing a third output signal indicating that the sensor signal has reached its maximum magnitude.

3. Apparatus as recited in claim 2 wherein said output circuit means comprises:

differentiation means for differentiating the sensor signal to provide a slope signal having a magnitude indicative of the time rate of change in the sensor signal; and means for detecting a zero crossing of the slope signal, said zero cross detecting means being adapted to provide the third output signal upon detecting a positive to negative transition of the slope signal and further being adapted to provide the third output signal upon detecting a negative to positive transition of the slope signal.

* * * * *